United States Patent
Ranganathan et al.

(10) Patent No.: US 12,315,972 B2
(45) Date of Patent: May 27, 2025

(54) SOLID OXIDE FUEL CELL SYSTEM CONTAINING LOW TEMPERATURE OXIDIZER AND METHOD OF OPERATING SAME WITH REDUCED CARBON MONOXIDE OUTPUT

(71) Applicant: Bloom Energy Corporation, San Jose, CA (US)

(72) Inventors: Srikanth Ranganathan, San Jose, CA (US); Victor Silva, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 520 days.

(21) Appl. No.: 17/861,746

(22) Filed: Jul. 11, 2022

(65) Prior Publication Data
US 2023/0011860 A1    Jan. 12, 2023

Related U.S. Application Data

(60) Provisional application No. 63/220,659, filed on Jul. 12, 2021.

(51) Int. Cl.
| | | |
|---|---|---|
| *H01M 8/0668* | (2016.01) | |
| *H01M 8/0432* | (2016.01) | |
| *H01M 8/0612* | (2016.01) | |

(52) U.S. Cl.
CPC ..... *H01M 8/0668* (2013.01); *H01M 8/04343* (2013.01); *H01M 8/0435* (2013.01); *H01M 8/04365* (2013.01); *H01M 8/0618* (2013.01)

(58) Field of Classification Search
CPC .......... H01M 8/0668; H01M 8/04343; H01M 8/0435; H01M 8/04365; H01M 8/0618
See application file for complete search history.

(56) References Cited

U.S. PATENT DOCUMENTS

| | | | | |
|---|---|---|---|---|
| 2004/0197246 | A1* | 10/2004 | Stevens | H01M 8/0618 422/201 |
| 2005/0164051 | A1* | 7/2005 | Venkataraman | H01M 8/2432 429/495 |
| 2005/0271914 | A1* | 12/2005 | Farooque | H01M 8/0668 429/410 |
| 2008/0092830 | A1* | 4/2008 | Suzuki | H01M 8/04097 123/3 |
| 2020/0251755 | A1* | 8/2020 | Jahnke | H01M 8/04097 |
| 2020/0403260 | A1* | 12/2020 | Jahnke | H01M 8/04126 |

FOREIGN PATENT DOCUMENTS

| | | | | |
|---|---|---|---|---|
| WO | WO-2008131051 A1 | * | 10/2008 | H01M 8/0606 |

* cited by examiner

*Primary Examiner* — Matthew J Merkling
(74) *Attorney, Agent, or Firm* — THE MARBURY LAW GROUP PLLC

(57) ABSTRACT

A fuel cell system includes a fuel cell stack configured to generate electricity, an anode exhaust and a cathode exhaust, an anode tail gas oxidizer (ATO) configured to oxidize the anode exhaust using the cathode exhaust, and a low-temperature oxidizer (LTO) configured to catalyze oxidation of carbon monoxide (CO) in the cathode exhaust output from the ATO.

20 Claims, 6 Drawing Sheets

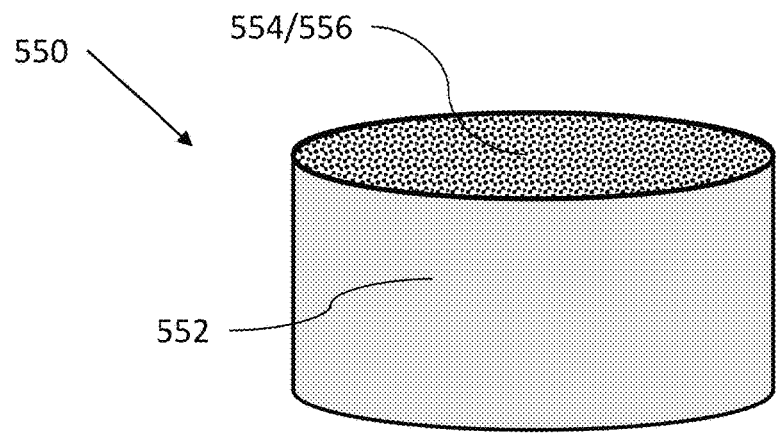
FIG. 4A
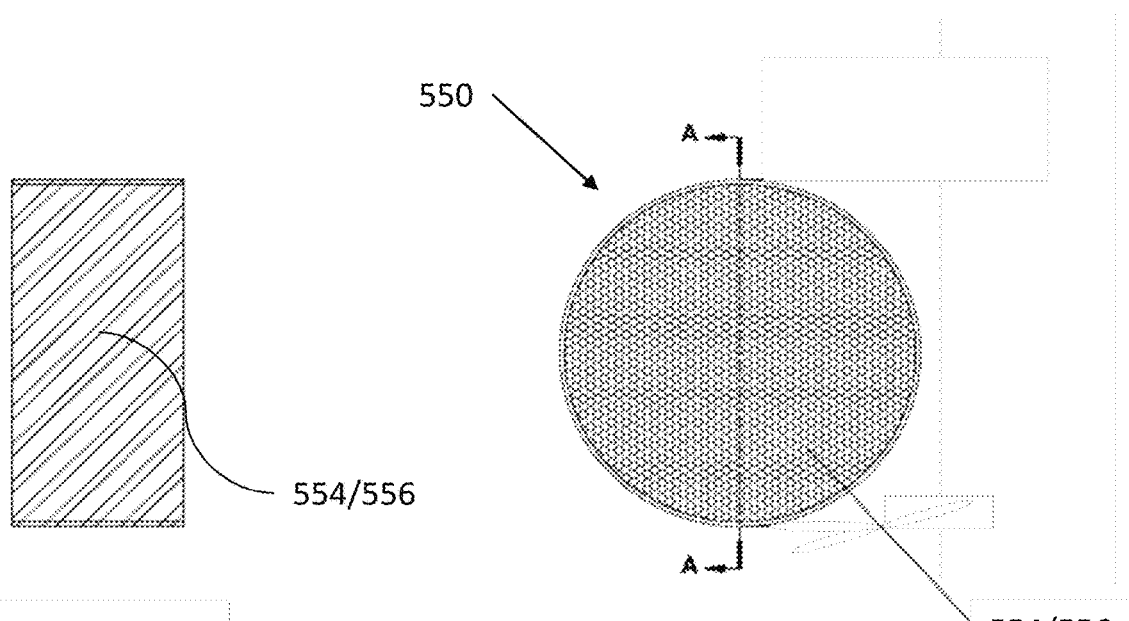
FIG. 4C
FIG. 4B

SOLID OXIDE FUEL CELL SYSTEM CONTAINING LOW TEMPERATURE OXIDIZER AND METHOD OF OPERATING SAME WITH REDUCED CARBON MONOXIDE OUTPUT

PRIORITY

This application is a non-provisional application that claims the benefit of U.S. Provisional Application No. 63/220,659, filed on Jul. 12, 2021, the contents of each of which are herein incorporated by reference in their entirety.

FIELD

Aspects of the present invention relate to solid oxide fuel cell systems and methods configured to reduce the carbon monoxide concentration in the system cathode exhaust using a low temperature oxidizer.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system includes a fuel cell stack configured to generate electricity, an anode exhaust and a cathode exhaust, an anode tail gas oxidizer (ATO) configured to oxidize the anode exhaust using the cathode exhaust, and a low-temperature oxidizer (LTO) configured to catalyze oxidation of carbon monoxide (CO) in the cathode exhaust output from the ATO.

According to various embodiments, a method of operating a fuel cell system includes generating electricity, an anode exhaust and a cathode exhaust from a fuel cell stack, oxidizing the anode exhaust using the cathode exhaust in an anode tail gas oxidizer (ATO), and catalyzing oxidation of carbon monoxide (CO) in the cathode exhaust output from the ATO in a low-temperature oxidizer (LTO).

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 4A is a perspective view of an LTO, according to various embodiments of the present disclosure. FIG. 4B is a top view of the LTO of FIG. 4A, and FIG. 4C is a side cross-sectional view taken along line A-A of FIG. 4B.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Herein, ranges can be expressed herein as from "about" one particular value, and/or to "about" another particular value. When such a range is expressed, examples include from the one particular value and/or to the other particular value. Similarly, when values are expressed as approximations, by use of the antecedent "about", "approximately", or "substantially", it will be understood that the particular value forms another aspect. In some embodiments, a value of "about X" may include values of +/−1% X. It will be further understood that the endpoints of each of the ranges are significant both in relation to the other endpoint, and independently of the other endpoint.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Solid oxide fuel cell (SOFC) systems are high efficiency "clean" energy generation systems that emit only low levels carbon monoxide (CO). However, cell systems that emit even lower levels carbon monoxide are desirable.

Figure 1:
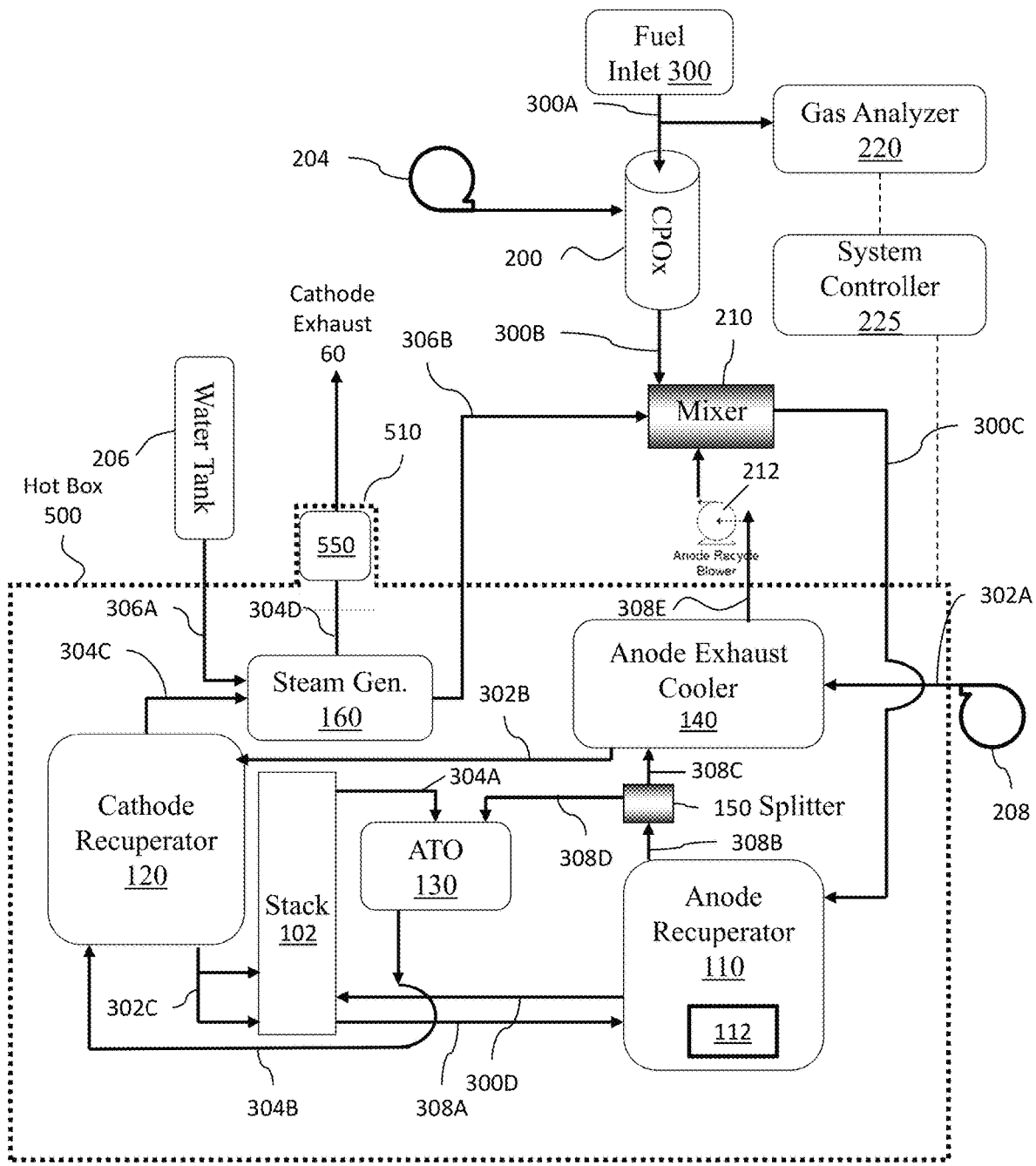
FIG. 1 is a schematic of a SOFC fuel cell system, according to various embodiments of the present disclosure.

FIG. 1 is a schematic representation of a SOFC system 10, according to various embodiments of the present disclosure. Referring to FIG. 1, the system 10 includes a hotbox 500 and various components disposed therein or adjacent thereto.

The hotbox 500 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hotbox 500 may also contain an anode recuperator 110, a cathode recuperator 120, an anode tail gas oxidizer (ATO) 130, an anode exhaust cooler (AEC) 140, a splitter 150, and a steam generator 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 500. Optionally, water from the water source 206 (e.g., water tank or pipe) may also be provided into the CPOx reactor 200 for use with higher hydrocarbon fuels, such as propane. However, the present disclosure is not limited to any particular location for each of the components with respect to the hotbox 500.

The CPOx reactor 200 receives a fuel inlet stream from a fuel inlet 300, through fuel conduit 300A. The fuel inlet 300 may be a utility gas line and/or a gas tank, such as a higher hydrocarbon gas tank (e.g., a propane tank), including a valve to control an amount of fuel provided to the CPOx reactor 200. The CPOx blower 204 may provide air to the CPOx reactor 202. The fuel and/or air may be provided to the mixer 210 by fuel conduit 300B. Fuel flows from the mixer 210 to the anode recuperator 110 through fuel conduit 300C, and flows from the anode recuperator 110 to the stack 102 through fuel conduit 300D.

The fuel is then reacted in the stack 102, and the resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air flows from the cathode recuperator 120 to the stack 102 through air conduit 302C.

Anode exhaust generated in the stack 102 is provided to the anode recuperator 110 through recycling conduit 308A. The anode exhaust may contain unreacted fuel. The anode exhaust may also be referred to herein as fuel exhaust. The anode exhaust may be provided from the anode recuperator 110 to a splitter 150 by recycling conduit 308B. A first portion of the anode exhaust may be provided from the splitter 150 to the anode exhaust cooler 140 by recycling conduit 308C. A second portion of the anode exhaust may be provided from the splitter 150 to the ATO 130 by recycling conduit 308D. Anode exhaust may be provided from the anode exhaust cooler 140 to mixer 210 by recycling conduit 308E. The anode recycle blower 212 may be configured to move anode exhaust though recycling conduit 308E, as discussed below.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B. Exhaust flows from the cathode recuperator 120 to the steam generator 160 through exhaust conduit 304C. Exhaust flows from the steam generator 160 through exhaust conduit 304D and out of the hotbox 500 through an exhaust outlet 510. Thus, a first exhaust conduit 304B fluidly connects the ATO 130 to the cathode recuperator 120, and is configured to provide the cathode exhaust from the ATO to the cathode recuperator. A second exhaust conduit 304C fluidly connects the cathode recuperator 120 to the steam generator 160, and is configured to provide the cathode exhaust from the cathode recuperator to the steam generator. A third exhaust conduit 304D fluidly connects the steam generator 160 to the exhaust outlet 510 containing a low temperature oxidizer ("LTO") 550, and configured to provide the cathode exhaust from the steam generator to the LTO.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel.

In some embodiments, such as during cold start-up operations, the CPOx reactor 200 may be operated until the fuel mixture in fuel conduit 300C reaches the minimum reaction temperature.

The fuel may then be provided to the anode recuperator 110 via fuel conduit 300D. The fuel may be heated in the anode recuperator 110 by the anode exhaust provided by recycling conduit 308A.

In some embodiments, the system 10 may optionally include a high-temperature pre-reformer 112. The pre-reformer 112 may include one or more catalysts configured to operate at temperatures of above about 400° C. For example, the catalysts may be disposed between walls of the anode recuperator 110, or may be disposed in an opening formed within the anode recuperator 110. In other embodiments, one or more of the catalysts may be in the form of pucks or disks. In other embodiments, one or more of the pre-reformer 112 may be disposed downstream of the anode recuperator 110, with respect to a fuel-flow direction.

In various embodiments, the catalysts may include a metallic/ceramic foam with a catalytic layer (e.g., palladium, nickel and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof. The reforming catalyst may include one or more nickel/rhodium catalysts configured to reform higher hydrocarbons (C2-C5) at very broad O:C ratios. For example, the reforming catalyst may be configured to reform a fuel stream having at least 10 vol % of C2 and C3 hydrocarbons, without significant coke formation. For example, the reforming catalyst 116 may be configured to reform a fuel stream having up to 20 vol %, up to 18 vol %, up to 16 vol %, up to 14 vol %, or up to 12 vol % of C2 and C3 hydrocarbons.

In some embodiments, the pre-reformer 112 may include a hydrogenation catalyst. The hydrogenation catalyst may be configured to combine unsaturated hydrocarbons, such as ethylene and/or propylene (alkenes), with available hydrogen in the fuel stream, resulting in saturated hydrocarbons, such as ethane and propane or other alkanes. The hydrogenation catalyst may be disposed upstream of the reforming catalyst or integrated throughout the reforming catalyst.

The hydrogenation catalyst may include a ceramic base, such as alumina, ceria, zirconia, or a mixture of ceria and zirconia, with a small percentage of a catalyst metal such as palladium. For example, the hydrogenation catalyst may include an amount of palladium ranging from about 0.1 wt % to about 5 wt %, such as from about 0.2 wt % to about 4 wt %, from about 0.3 wt % to about 3 wt %, or about 0.5 wt % to about 2 wt %. The hydrogenation catalyst may also include some inhibitors and/or stabilizers such as vanadium, tungsten, and/or other similar transition metal materials.

Fuel is provided from the anode recuperator 110 to the stack 102 by fuel conduit 300D, where the fuel is reacted to generate electricity. The resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system 10 may further include a system controller 225 configured to control various elements of the system 10, and may optionally include a gas analyzer 220 configured to analyze the fuel in fuel conduit 300A. The controller 225 may include a central processing unit configured to execute stored instructions. For example, the controller 225 may configured to control fuel, air flow through the system 10, and/or the operation of the CPOx reactor 200. The controller 225 may be configured to control amounts (e.g., flow rates) of steam, fuel, and anode exhaust provided to the mixer 210. In various embodiments, the controller 225 may also be configured to control relative amounts of anode exhaust provided from the stack 102 to the ATO 130 and the anode recuperator 110.

Figure 2B:
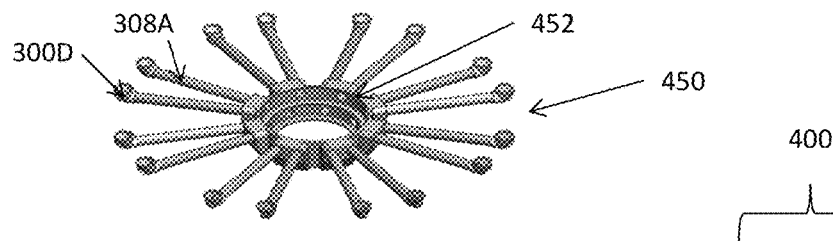
FIG. 2B illustrates an anode hub structure connected to the column of FIG. 2A.
Figure 2A:
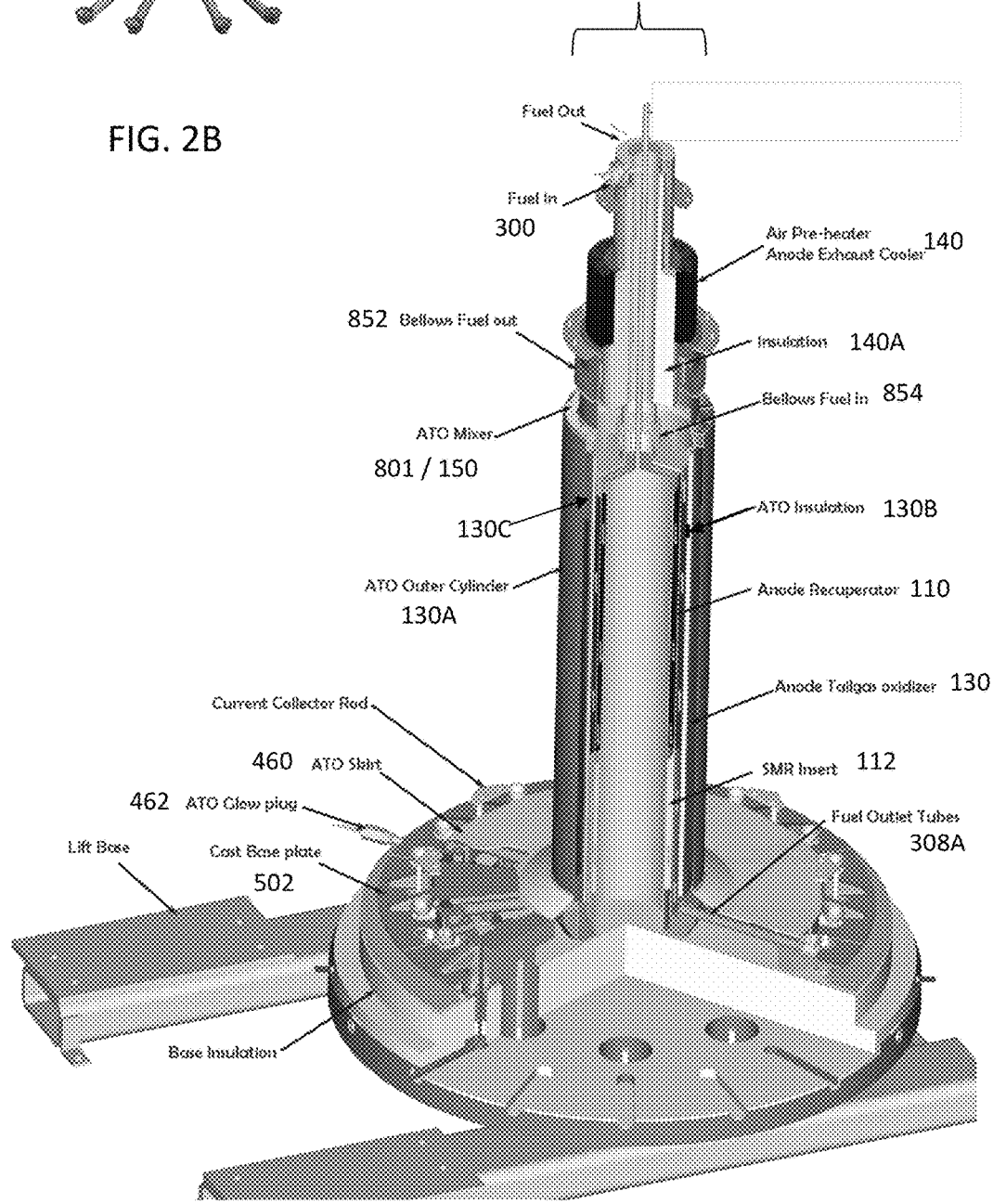
FIG. 2A is a sectional perspective view of a central column of the fuel cell system of FIG. 1.

FIG. 2A illustrates a central column 400 of the system 10, according to various embodiments of the present disclosure. FIG. 2B illustrates an anode hub structure 450 disposed in a hotbox base 502 on which the central column 400 may be disposed. Referring to FIGS. 2A and 2B, fuel cell stacks (not shown) may be disposed around the central column 400, on the hotbox base 502. The central column 400 includes the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An oxidation catalyst may be located in the space between the outer cylinder 130A and the ATO insulation 130B.

The anode hub structure 450 is positioned under the anode recuperator 110 and ATO 130 and over the hotbox base 502. The anode hub structure 450 is covered by an ATO skirt 460. A combined ATO mixer 801 and fuel exhaust splitter 150 is located over the anode recuperator 110 and ATO 130 and below the anode cooler 140. An ATO glow plug 462, which aids the oxidation of the stack fuel exhaust in the ATO, may be located near the bottom of the ATO 130.

The anode hub structure 450 is used to distribute fuel evenly from a central plenum to fuel cell stacks disposed around the central column 400. The anode hub structure 450 includes a grooved cast base 452 and a "spider" hub of fuel inlet conduits 300D and outlet conduits 308A. Each pair of conduits 300D, 308A connects to a fuel cell stack. Anode side cylinders (e.g., anode recuperator 110 inner and outer cylinders and ATO outer cylinder 130A) are then welded or brazed into grooves formed in the base 452, creating a uniform volume cross section for flow distribution.

Figure 2C:
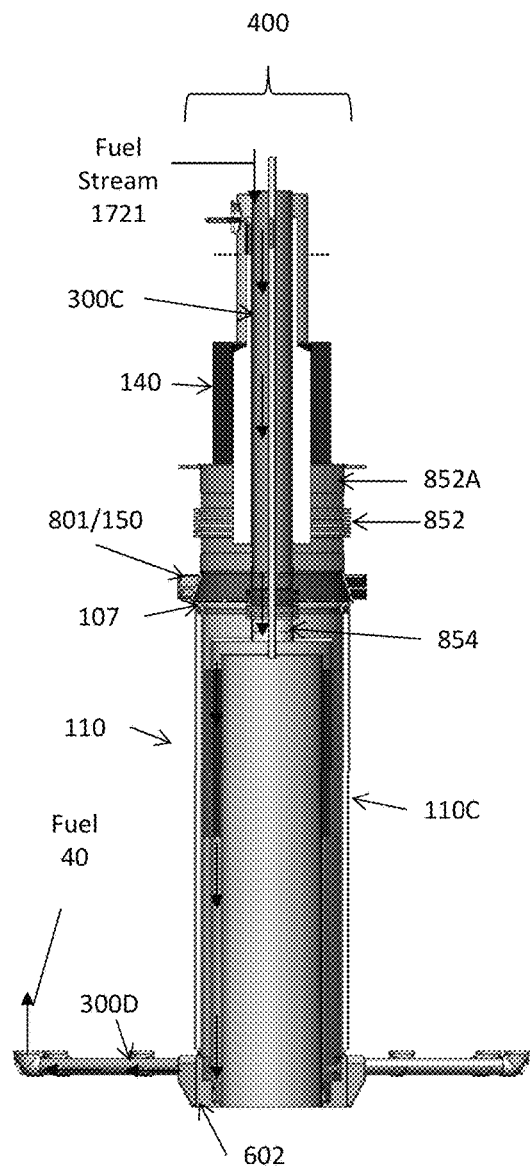
FIGS. 2C-2E are perspective and sectional views of components of the central column of FIG. 2A, according to various embodiments of the present disclosure.
Figure 2D:
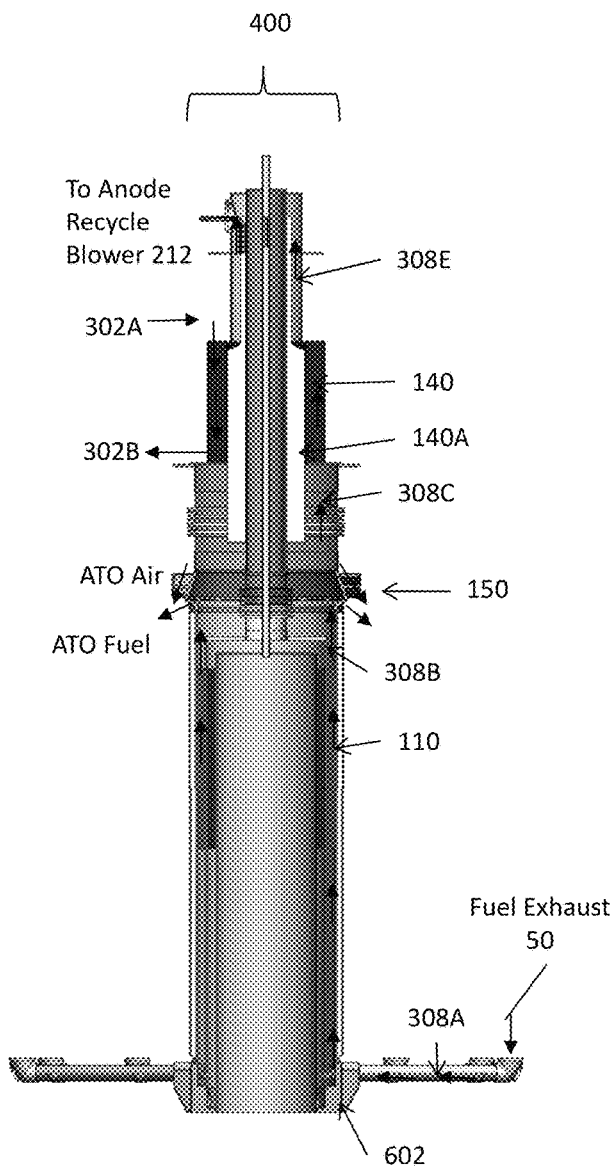
Figure 2E:
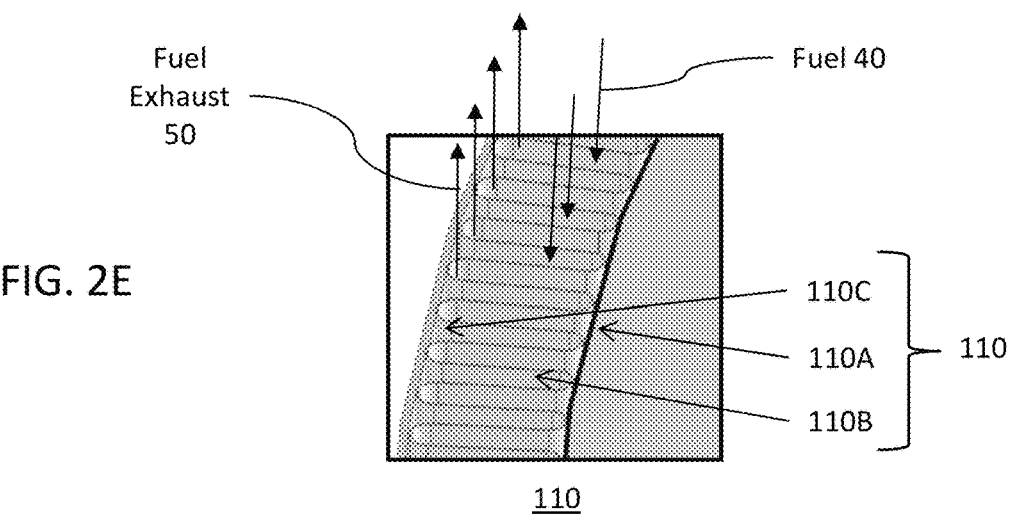

FIGS. 2C and 2D are side cross-sectional views showing flow distribution through the central column 400, and FIG. 2E is top cross-sectional view taken through the anode recuperator 110. Referring to FIGS. 1, 2D and 2E, the anode recuperator 110 includes an inner cylinder 110A, a corrugated plate 110B, and an outer cylinder 110C that may be coated with the ATO insulation 130B. Fuel (i.e., the fuel inlet stream) 40 from fuel conduit 300A enters the top of the central column 400. The fuel 40 then bypasses the anode cooler 140 by flowing through its hollow core and fuel bellows 854, and then flows through the anode recuperator 110, between the outer cylinder 110C and the and the corrugated plate 110B. The fuel 40 then flows through the base 452 and conduits 300D of the anode hub structure 450 (shown in FIG. 2B), to the stacks 102.

Referring to FIGS. 1, 2D and 2E, fuel exhaust 50 flows from the stacks through conduits 308A into the base 452, and from the base 452 through the anode recuperator 110, between in inner cylinder 110A and the corrugated plate 110B, and into the splitter 150. A portion of the fuel exhaust 50 flows from the splitter 150 to the anode cooler 140 through recycling conduit 308C, while another portion flows from the splitter 150 to the ATO 130 through recycling conduit 308D (see FIG. 1). Anode cooler inner core insulation 140A may be located between the fuel conduit 300D and bellows 852/supporting cylinder 852A located between the anode exhaust cooler 140 and the ATO mixer 801, as shown in FIGS. 2A, 2B, and 2C. This insulation minimizes heat transfer and loss on the way to the anode exhaust cooler 140. Insulation 140A may also be located between fuel conduit 300D and the anode exhaust cooler 140 to avoid heat transfer between the fuel inlet stream in fuel conduit 300D and the streams in the anode cooler 140. A bellows 852 and a supporting cylinder 852A may be disposed between the anode cooler 140 and the splitter 150.

FIG. 2D also shows air flowing from the air conduit 302A to the anode cooler 140 (where it exchanges heat with the fuel exhaust stream), into air conduit 302B to the cathode recuperator 120.

As shown in FIGS. 1 and 2D, the fuel exhaust 50 exits the anode recuperator 110 and is provided into the splitter 150 through recycling conduit 308B. The splitter 150 splits the anode exhaust stream into first and second anode exhaust streams. The first stream is provided to the ATO 130 through recycling conduit 308D. The second stream is provided into the anode cooler 140 through recycling conduit 308C.

The relative amounts of anode exhaust provided to the ATO 130 and the anode exhaust cooler 140 is controlled by the anode recycle blower 212. The higher the anode recycle blower 212 speed, the larger portion of the fuel exhaust stream is provided into recycling conduit 308C and a smaller portion of the fuel exhaust stream is provided to the ATO 130, and vice-versa. Preferably, the splitter 150 comprises an integral cast structure with the ATO mixer 801.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 150 may have a temperature of above 350° C., such as from about 350 to about 500° C., for example, from about 375 to about 425° C., or from about 390 to about 410° C. Furthermore, since a smaller amount of anode exhaust is provided into the anode cooler 140 (e.g., not 100% of the anode exhaust is provided into the anode cooler due to the splitting of the anode exhaust in splitter 150), the heat exchange area of the anode cooler 140 may be reduced. The anode exhaust stream provided to the ATO 130 may be oxidized and provided to the cathode recuperator 120 through exhaust conduit 304B.

Figure 3A:
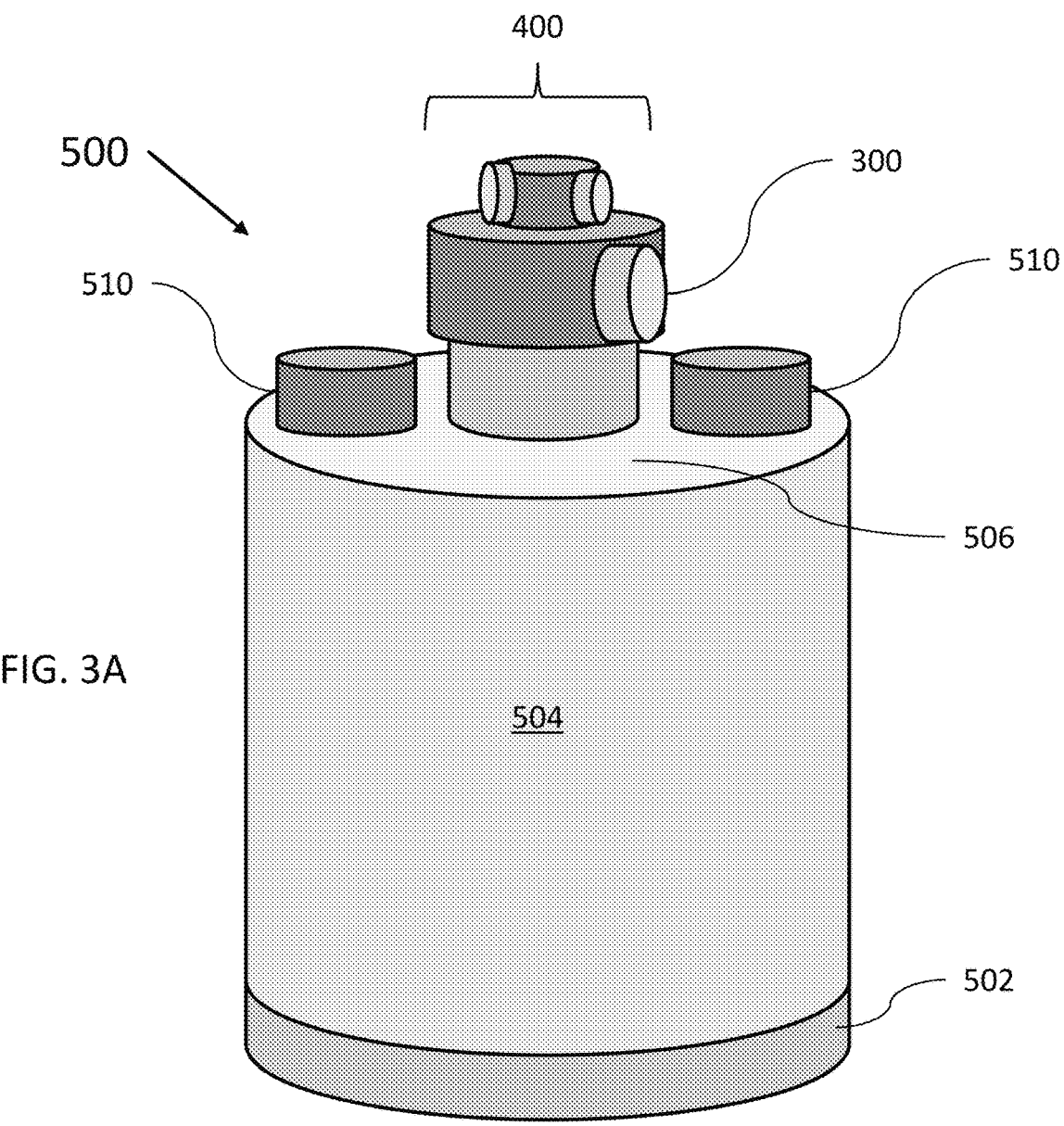
FIG. 3A is a perspective view of a hotbox 500, according to various embodiments of the present disclosure.
Figure 3B:
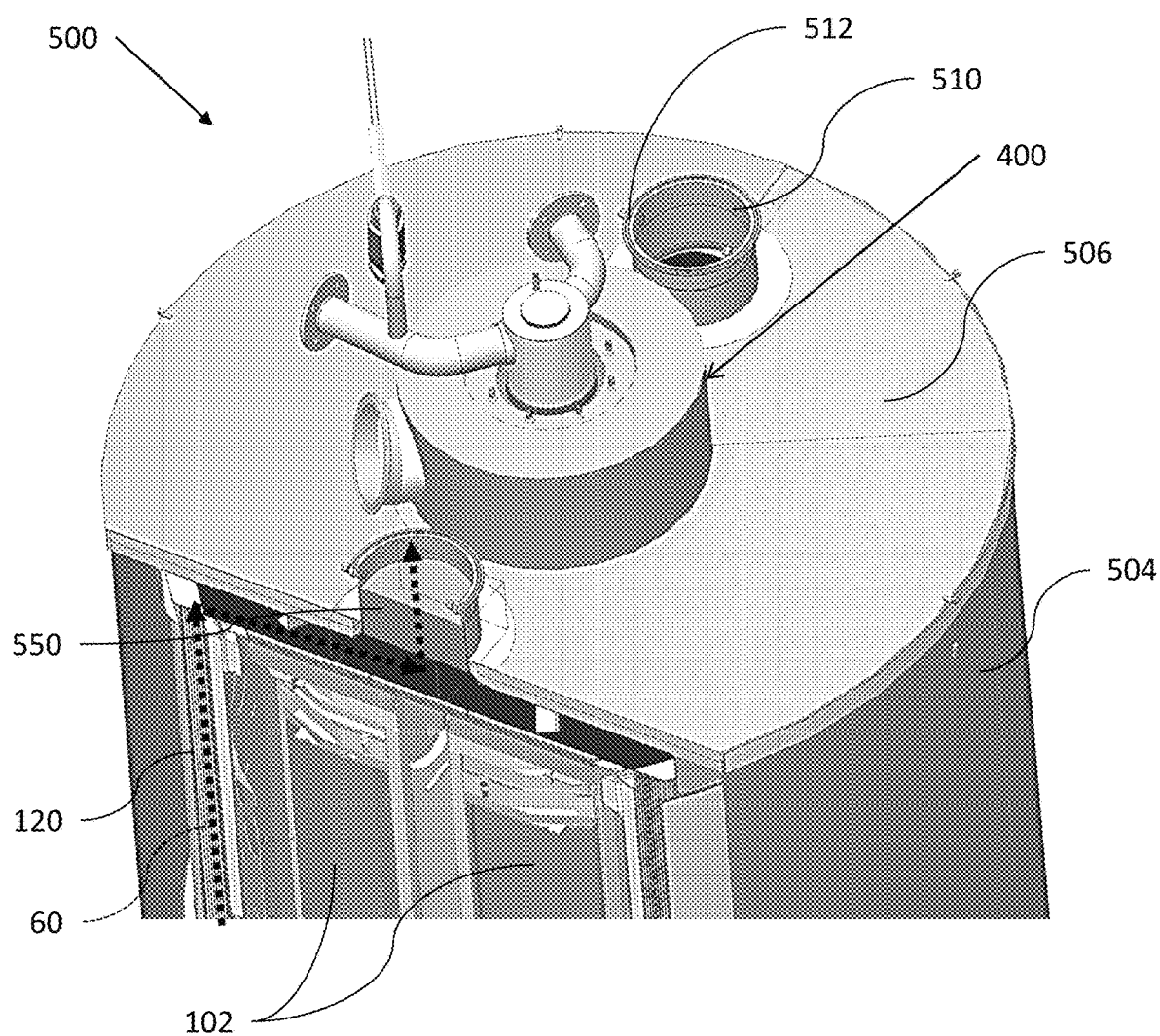
FIG. 3B is a sectional perspective view of the hotbox 500 of FIG. 3A.

FIG. 3A is a perspective view of a hotbox 500, according to various embodiments of the present disclosure, and FIG. 3B is a sectional perspective view of the hotbox 500 of FIG. 3A. Referring to FIGS. 1, 3A, and 3B, the hotbox 500 may include the base 502, an outer shell 504, and a cover 506. The cover 506 may include one or more exhaust outlets 510. The central column 400 and the fuel cell stacks 102 may be disposed in the hotbox 500. In particular, the fuel cell stacks 102 may be arranged around the central column 400, and an upper end of the column 400 may extend though the cover 506.

The cathode recuperator 120 may be disposed inside of the outer shell 504, surrounding the fuel cell stacks 102. During operation, cathode exhaust 60 output from the fuel cell stacks 102 may be provided to the ATO 130, mixed with fuel exhaust output from the splitter 150, and the fuel exhaust is oxidized in the ATO 130. The cathode exhaust 60 output from the ATO 130 (i.e., the ATO exhaust) may be provided to the cathode recuperator 120 where it is cooled by transferring heat to air provided from the anode exhaust cooler 140. The cathode exhaust 60 may then be provided to the steam generator 160, where heat may be transferred from the cathode exhaust 60 to water in the steam generator 160, to thereby generate steam. The steam generator 160 may include steam coils (not shown) disposed below the cover 506 and above the fuel cell stacks 102. The cathode exhaust 60 may then be provided to the exhaust outlets 510 and output from the hotbox 500. During steady-state operation, the cathode exhaust (i.e., ATO exhaust) flowing thought the exhaust outlets 510 may have a temperature ranging from about 250° C. to about 350° C., such as about 300° C., due to the above-described heat transfer.

The cathode exhaust 60 output from the fuel cell stack 102 may include carbon monoxide (CO). A majority of the CO may be oxidized in the ATO 130 and converted into carbon dioxide. However, a small residual amount of CO may remain in the cathode exhaust (i.e., ATO exhaust) 60 output from the ATO 130. As such, the cathode exhaust 60 flowing through the cathode recuperator 120, steam generator 160, and exhaust outlets 510 may contain a small amount of CO.

According to various embodiments, the hotbox 500 may include a low temperature oxidizer (LTO) 550 configured to oxidize CO in the cathode exhaust 60. For example, the LTO 550 may be configured to reduce a CO content of the cathode exhaust 60, while the cathode exhaust is at a relatively low temperature. For example, the LTO 550 may reduce the CO content of the cathode exhaust 60 to less than about 5 parts-per-million (ppm), such as less than about 1 ppm, such as 0 to 0.75 ppm, for example 0.01 to 0.5 ppm, when provided with cathode exhaust having a temperature ranging from about 150° C. to about 450° C., such as about 200° C. to about 400° C., from about 250° C. to about 350° C., or about 300° C. Thus, the LTO is "low temperature" in a sense that it operates at a lower temperature than the ATO 130.

An LTO 550 may be disposed in each of the exhaust outlets 510. The LTOs 550 may have a puck-shaped structure (e.g., cylindrical structure) and may be configured to be inserted into the respective exhaust outlets 510, such that cathode exhaust (i.e., ATO exhaust) flowing through the exhaust outlets 510 is forced to flow through the LTOs 550. In some embodiments, the LTOs 550 may have an outer diameter that is approximately the same as the inner diameter of the exhaust outlets 510. For example, the LTOs 550 may have a diameter that is within +/−1% of the inner diameter of the exhaust outlets 510. The hotbox 500 may include screws, bolts, clamps and/or other fastening devices 512 configured to secure the LTOs 550 in the exhaust outlets 510.

Although LTO 550 may be disposed in each of the exhaust outlets 510, the embodiments of the invention are not so limited. In various configurations, LTO 550 may be disposed at various locations upstream (e.g., within hotbox 500) or downstream (e.g., outside hotbox 500) and utilized to optimize CO conversion. For example, CO conversion may be optimized based on one or more of temperature, surface area, assembly needs, field replacement, catalyst composition, etc.

FIG. 4A is a perspective view of an LTO 550, according to various embodiments of the present disclosure. FIG. 4B is a top view of the LTO 550 of FIG. 4A, and FIG. 4C is a sectional view taken along line A-A of FIG. 4B. Referring to FIGS. 4A-4B, the LTO 550 may be a metallic puck-shaped (i.e., cylindrical) structure including a mantel 552 and a catalyst support 554 that is coated with an oxidation catalyst 556. However, non-cylindrical shapes may also be used. The catalyst support 554 may be a disposed in and/or supported by the mantel 552. The catalyst support 554 may be a porous structure or matrix that is configured to permit the flow of the cathode exhaust 60 there through, without significantly impeding exhaust flow. In other words, the catalyst support 554 may be configured such that the cathode exhaust 60 flows through the LTO 550 with a minimal reduction in exhaust pressure. For example, the LTO 550 may reduce the exhaust pressure by about 20% or less, such as by about 10% or less. The catalyst support 554 may be in a shape of concentric, annual corrugated sheets or a honeycomb matrix having passages there through.

The catalyst support 554 may be formed of a metal foil or ceramic material, such as alumina, having a high surface area, such that a high amount of interaction occurs between the cathode exhaust 60 flowing through the catalyst support 554 interacts and the oxidation catalyst 556. The oxidation catalyst 556 may be configured to have a peak catalytic activity at temperatures ranging from about 150° C. to about 700° C., such as from about 180° C. to about 650° C., from about 200° C. to about 600° C., or from about 250° C. to about 450° C. For example, the oxidation catalyst 556 may include a D-block metal, such as gold (Au) and/or one or more platinum group metals such as, platinum (Pt), palladium (Pd), rhodium (Rh), iridium (Ir), osmium (Os), ruthenium (Ru), or a combination thereof. In some embodiments, the oxidation catalyst 556 may comprise platinum or platinum stabilized with another metal, such as manganese (Mn), iron (Fe), cobalt (Co), nickel (Ni), and/or copper (Cu). Thus, if the ATO 130 includes a more expensive catalyst, such as Pd, then the LTO 550 may include a less expensive catalyst, such as Pt or a Pt based catalyst, to reduce the total cost of the system.

The LTO 550 may also be configured to operate at relatively low temperatures, such as the temperature of cathode exhaust output from a SOFC hotbox, such that the LTO 550 does not require an additional (i.e., external) heating source. As such, the LTO 550 may reduce CO output without significantly reducing system efficiently.

In other embodiments, the oxidation catalyst 556 may be coated on the cathode recuperator 120 and the LTO 550 is integrated with the cathode recuperator 120.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system, comprising:
a fuel cell stack configured to generate electricity, an anode exhaust and a cathode exhaust;

an anode tail gas oxidizer (ATO) configured to oxidize the anode exhaust using the cathode exhaust; and a low-temperature oxidizer (LTO) configured to catalyze oxidation of carbon monoxide (CO) in the cathode exhaust output from the ATO.

2. The system of claim 1, wherein the LTO comprises:
a mantel;
a porous catalyst support disposed within the mantel; and
an oxidation catalyst coated on the catalyst support.

3. The system of claim 2, wherein the oxidation catalyst has a peak catalytic activity at a temperature ranging from about 180° C. to about 650° C.

4. The system of claim 3, wherein the oxidation catalyst comprises a platinum-based catalyst.

5. The system of claim 4, wherein the oxidation catalyst consists essentially of platinum.

6. The system of claim 4, wherein the oxidation catalyst comprises platinum stabilized with another metal.

7. The system of claim 2, wherein the catalyst support comprises a metal foil or a ceramic matrix.

8. The system of claim 1, wherein the LTO is configured to reduce a CO concentration to less than 1 parts per million (ppm) in the cathode exhaust having a temperature ranging from about 200° C. to about 400° C.

9. The system of claim 1, further comprising:
a hotbox housing the fuel cell stack; and
an exhaust outlet configured to output the cathode exhaust from the hotbox.

10. The system of claim 9, wherein the LTO is located inside of the exhaust outlet, such that the cathode exhaust flowing through the exhaust outlet is forced to flow through the LTO.

11. The system of claim 10, further comprising a cathode recuperator located in the hot box and configured to heat air provided to the fuel cell stack using heat extracted from the cathode exhaust output from the ATO.

12. The system of claim 11, further comprising:
a first exhaust conduit fluidly connecting the ATO to the cathode recuperator, and configured to provide the cathode exhaust from the ATO to the cathode recuperator;
a steam generator configured generate steam using heat extracted from cathode exhaust output from the cathode recuperator;
a second exhaust conduit fluidly connecting the cathode recuperator to the steam generator, and configured to provide the cathode exhaust from the cathode recuperator to the steam generator; and
a third exhaust conduit fluidly connecting the steam generator to the LTO, and configured to provide the cathode exhaust from the steam generator to the LTO.

13. The system of claim 12, further comprising:
a central column disposed in the hotbox and comprising an anode exhaust cooler and an anode recuperator; and
multiple fuel cell stacks disposed in the hotbox and arranged around the central column,
wherein the cathode recuperator is disposed between the fuel cell stacks and an outer shell of the hotbox.

14. The system of claim 10, wherein further comprising:
an additional exhaust outlet configured to output cathode exhaust from the hotbox; and
an additional LTO disposed in the additional exhaust outlet.

15. The system of claim 1, wherein the fuel cell stack comprises a solid oxide fuel cell stack.

16. A method of operating a fuel cell system, comprising:
generating electricity, an anode exhaust and a cathode exhaust from a fuel cell stack;
oxidizing the anode exhaust using the cathode exhaust in an anode tail gas oxidizer (ATO); and
catalyzing oxidation of carbon monoxide (CO) in the cathode exhaust output from the ATO in a low-temperature oxidizer (LTO).

17. The method of claim 16, wherein:
the fuel cell stack comprises a solid oxide fuel cell stack; and
oxidation of the CO in the LTO reduces CO concentration to less than 1 parts per million (ppm) in the cathode exhaust having a temperature ranging from about 200° C. to about 400° C.

18. The method of claim 17, further comprising:
providing the cathode exhaust from the ATO to a cathode recuperator to heat air provided to the fuel cell stack using heat extracted from the cathode exhaust;
providing the cathode exhaust from the cathode recuperator to a steam generator to generate steam using heat extracted from cathode exhaust; and
providing the cathode exhaust from the steam generator to the LTO.

19. The method of claim 18, wherein:
the fuel cell stack, the ATO, the cathode recuperator and the steam generator are located in a hot box; and
the LTO is located an exhaust outlet of the hot box through which the cathode exhaust flows out of the hot box.

20. The method of claim 16, wherein the LTO comprises:
a mantel;
a porous catalyst support disposed within the mantel; and
a platinum based oxidation catalyst coated on the catalyst support.

\* \* \* \* \*